US009525511B2

(12) United States Patent
Baker et al.

(10) Patent No.: US 9,525,511 B2
(45) Date of Patent: Dec. 20, 2016

(54) FEEDBACK INFORMATION IN A MULTI-CARRIER WIRELESS TELECOMMUNICATIONS NETWORK

(75) Inventors: Matthew P. J. Baker, Canterbury (GB); Sarah Boumendil, Chevreuse (FR); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 734 days.

(21) Appl. No.: 13/521,268

(22) PCT Filed: Dec. 16, 2010

(86) PCT No.: PCT/EP2010/007775
§ 371 (c)(1),
(2), (4) Date: Oct. 11, 2012

(87) PCT Pub. No.: WO2011/082805
PCT Pub. Date: Jul. 14, 2011

(65) Prior Publication Data
US 2013/0021913 A1    Jan. 24, 2013

(30) Foreign Application Priority Data
Jan. 11, 2010    (EP) .................................... 10290009

(51) Int. Cl.
*H04L 1/00*    (2006.01)
*H04L 1/16*    (2006.01)
(Continued)

(52) U.S. Cl.
CPC .......... *H04L 1/0026* (2013.01); *H04L 1/1607* (2013.01); *H04L 5/006* (2013.01); *H04L 5/0053* (2013.01);
(Continued)

(58) Field of Classification Search
CPC ...... H04L 5/0055; H04L 5/0053; H04L 5/001; H04L 1/0026; H04L 5/0057; H04L 1/1861
See application file for complete search history.

(56) References Cited

U.S. PATENT DOCUMENTS

2005/0201474 A1*  9/2005  Cho et al. .................... 375/260
2006/0221883 A1* 10/2006  Damnjanovic et al. ...... 370/315
(Continued)

FOREIGN PATENT DOCUMENTS

JP    2008538061 A    10/2008

OTHER PUBLICATIONS

Qualcomm Europe, "CQI Feedback for Multicarrier Operation," 3rd Generation Partnership Project (3GPP), 3GPP TSG RAN WG1 #58bis, R1-094207, XP050388677, pp. 1-4, Miyazaki, Japan, Oct. 12-16, 2009.
Qualcomm Europe, "HS-DPCCH CQI Design for 4C-HSDPA," 3rd Generation Partnership Project (3GPP), 3GPP TSG RAN WG1 Meeting #58bis, R1-094069, XP050388549, pp. 1-17, Miyazaki, Japan, Oct. 12-16, 2009.
(Continued)

*Primary Examiner* — Jung Park
(74) *Attorney, Agent, or Firm* — Fay Sharpe, LLP

(57) ABSTRACT

Apparatus and method for encoding and transmitting feedback information from a first network node to a second network node in a multi-carrier wireless telecommunications network. The first network node is operable to receive signals from the second network node on two or more reception carriers and transmit data to the second network node on one or more transmission carriers. Each reception carrier being transmitted within an associated a radio band. The method comprises the steps of: (i) monitoring for a signal on at least two of the reception carriers; (ii) generating feedback information for at least two of the reception carriers based upon received signals; (iii) grouping the feedback information for reception carriers being transmitted within the same radio band; and encoding said grouped feedback information for two or more reception carriers
(Continued)

being transmitted within the same radio band; and iv) transmitting the encoded feedback information to the second network node on one or more transmission carriers.

11 Claims, 2 Drawing Sheets

(51) Int. Cl.
*H04L 5/00* (2006.01)
*H04L 27/26* (2006.01)
(52) U.S. Cl.
CPC ......... *H04L 5/0094* (2013.01); *H04L 27/2602* (2013.01); *H04L 1/0029* (2013.01); *H04L 27/2614* (2013.01)

(56) References Cited

U.S. PATENT DOCUMENTS

2011/0170420 A1* 7/2011 Xi ........................... H04L 5/001
370/241
2013/0163550 A1* 6/2013 Marinier ............... H04W 72/04
370/329

OTHER PUBLICATIONS

New Postcom, "Analysis on Carrier Activation and De-activation," 3rd Generation Partnership Project (3GPP), 3GPP TSG-RAN WG2 Meeting #68bis, R2-100280, pp. 1-4, Valencia, Spain, Jan. 18-22, 2010.
International Search Report for PCT/EP2010/007775 dated Apr. 27, 2011.
Alcatel-Lucent, "Component carrier indication for bandwidth extension in LTE-A," 3rd Generation Partnership Project (3GPP), 3GPP TSG RAN WG1 #58bis, R1-093362, pp. 1-5, Shenzhen, China, Aug. 24-28, 2009.
Qualcomm Europe, "CQI Feedback for Multicarrier Operation [online]", 3GPP TSG-RAN WG1#58b R1-094207, Internet <URL: http://www.3gpp.org/ftp/tsg_ran/WG1_RL1/TSGR1_58b/Docs/R1-094207.zip>, Oct. 12-16, 2009.
Huawei, "Discussion on Supplementary Carrier Controlling [online]", 3GPP TSG-RAN WG2#62bis R2-083520, Internet <URL: http://www.3gpp.org/ftp/tsg_ran/WG2_RL2/TSGR2_62bis/Docs/R2-083520.zip>, Jun. 30-Jul. 14, 2008.
Japanese Office Action (Translation) of corresponding Japanese Patent Application No. 2012-548351, Drafted Jul. 17, 2013, Dispatched Jul. 23, 2013, 4 pages.

* cited by examiner

FEEDBACK INFORMATION IN A MULTI-CARRIER WIRELESS TELECOMMUNICATIONS NETWORK

FIELD OF THE INVENTION

The present invention relates to a method of encoding and transmitting feedback information in a multi-carrier wireless telecommunications network, a network node operable to carry out that method and a computer program product.

BACKGROUND

Single carrier wireless telecommunications systems are known. In those known systems, radio coverage is provided to user equipment, for example, mobile telephones, by geographical area. A base station is located in each geographical area to provide the required radio coverage. User equipment in the area served by a base station receives information and data from the base station and transmits information and data to the base station. In a high speed downlink packet access (HSDPA) telecommunications network, data and information is sent between user equipment and a base station in data packets on a radio frequency carrier.

Information and data transmitted by the base station to the user equipment occurs on radio frequency carriers known as downlink carriers. Information and data transmitted by user equipment to the base station occurs on radio frequency carriers known as uplink carriers.

In known wireless telecommunication systems operating in single carrier mode, user equipment can move between geographical base station coverage areas. Service provided to user equipment is overseen by a radio network controller (RNC). The radio network controller communicates with user equipment and base stations and determines which base station each user equipment is primarily connected to. Furthermore, a radio network controller acts to control and communicate with a base station and user equipment when user equipment moves from the geographical area served by one base station to a geographical area served by another base station.

It has been proposed to allow base stations and user equipment to each transmit simultaneously on more than one carrier. Furthermore it has been proposed to allow user equipment and base stations to receive simultaneously on more than one carrier frequency. Each carrier, both uplink and downlink, is typically independently power controlled and independently scheduled by a base station. Provision of more than one downlink carrier, for example, on four frequency carriers, allows for an increase in data throughput to the user equipment. Networks having more than two carriers may be referred to as "multi cell high speed downlink packet access" (MC-HSDPA) networks. The term "multi-carrier" network used herein is envisaged to cover the case where two, three, four, or more downlink (or uplink) carriers are provided for in a network.

Provision of multi-carrier functionality may have associated problems. Accordingly, it is desired to improve the operation of a wireless telecommunications network having multi-carrier functionality.

SUMMARY

Accordingly, a first aspect provides a method of encoding and transmitting feedback information from a first network node to a second network node in a multi-carrier wireless telecommunications network, the first network node being operable to: receive signals from the second network node on two or more reception carriers, each reception carrier being transmitted within as associated radio band, and transmit data to the second network node on one or more transmission carriers, the method comprising the steps of:

(i) monitoring for a signal on at least two of the reception carriers;
(ii) generating feedback information for at least two of said reception carriers based upon received signals;
(iii) grouping the feedback information for reception carriers being transmitted within the same radio band; and encoding the grouped feedback information for two or more reception carriers being transmitted within the same radio band; and
(iv) transmitting the encoded feedback information to the second network node on one or more transmission carriers.

It will be appreciated that in a multiple downlink carrier wireless telecommunications network feedback is likely to be required for each downlink carrier provided. Such feedback may, for example, comprise: acknowledgement feedback for an implemented acknowledgement protocol, channel quality indicators (CQI), and pre-coding control indicators (PCI) used to indicate suitable transmission parameters for the data transmissions on each downlink carriers. It will be understood that such feedback can help to ensure that the network operates efficiently. For example, the feedback associated with utilizing a data transmission regime in which an acknowledgement protocol is operating enables erroneously-decoded data packets, or transport blocks of data, to be retransmitted, and enables transmission of redundant data packets, or transport blocks of data, to be minimized. Feedback information in such a protocol (in the form of an ACK or NACK) can inform the network of whether a data packet is successfully received and, if an acknowledgement of successful receipt is fed back and received, there is no need to re-send that data packet. Conversely, if a negative acknowledgement is fed back and received, a data packet can be re-sent. Protocols of the HARQ (Hybrid Automatic Repeat Request) types are examples of such an acknowledgement protocol.

In a HSDPA system operating in single carrier mode, necessary feedback information relating to downlink carriers is signaled in an uplink carrier. The feedback information is signaled on a known format of an uplink signaling channel known as the High-Speed Dedicated Physical Control Channel (HS-DPCCH).

HS-DPCCH formats may use a spreading factor 256 channelization code. Such a format allows 10 bits per 0.666 ms timeslot. Those HS-DPCCH formats may allow an uplink HS-DPCCH channel on an uplink carrier to carry feedback for up to 2 downlink carriers by multiplexing the relevant control information for the two carriers into the available bits of the SF256 code.

For HSDPA systems capable of operating in a multi-carrier mode, more than two downlink carriers may be provided. It will be appreciated that in multi-carrier HSDPA networks, the number of downlink carriers may not match the number of uplink carriers, or the number of uplink HS-DPCCH channels. Furthermore, the number of downlink carriers provided may not be exactly double the number of uplink carriers or uplink HS-DPCCH channels provided.

Each uplink, or transmission, carrier may comprise one or more data channels on which feedback may be transmitted. Feedback information according to the first aspect may be transmitted to said second network node on one or more transmission channels of one or more transmission carriers.

The first aspect recognizes that techniques for providing carrier feedback in a multi-carrier network may suffer disadvantages.

For example, possibilities to carry feedback in a 4 downlink carrier system include use of a SF128 code channel. Such a SF128 channelization code channel provides 20 bits per timeslot and therefore may allow for the mapping of all required feedback information into a single HS-DPCCH channel of a single uplink carrier. Such an arrangement suffers the disadvantage of requiring new multiplexing and coding formats. As a result, implementation using existing system architecture and processes may be complex.

An alternative possibility is the use of multiple SF256 code channels. According to such a scheme, a rule is required to determine how to map feedback corresponding to each downlink carrier onto HS-DPCCHs provided by one or more uplink carrier. Furthermore, in view of the disadvantages associated with using a single SF128 code channel, the use of multiple SF256 code channels may be preferred when more than two downlink carriers are provided.

The first aspect recognizes that a rule implementing use of SF256 spreading code channels for a multi-carrier system may advantageously take into account that different downlink carriers may be activated and deactivated dynamically.

In a multi-carrier system there may be provided N downlink carriers. Those downlink carriers may be denoted by: C(1), C(2) ... C(n) ... to C(N). In such a system there may also be provided and a set of HS-DPCCHs. Those dedicated data channels may be provided on a single uplink carrier, or may be provided on one or more uplink carriers. Each available HS-DPCCH is denoted by: H(1), H(2) ... H(m) ... H(M) (where M may be equal to N/2 since each HS-DPCCH may carry feedback for 2 downlink carriers).

If M=N/2, one possibility regarding a mapping rule for implementing use of a SF256 spreading code is to map feedback for downlink carrier C(n) to HS-DPCCH H((n/2)) where (n/2) here denotes rounding up to the nearest integer (the "ceiling" function).

However, that mapping rule may result in the use of more HS-DPCCH codes than are strictly necessary. For example: if N=4 and C(2) and C(3) are deactivated, then according to such a rule, two HS-DPCCHs will be required. A more efficient rule may take account of carrier activation. Use of more HS-DPCCHs than required has the disadvantage of increasing the cubic metric (CM) of the transmitted signal and therefore implementation costs. Such a rule also fails to take into account that the different carriers may be in different frequency bands with possibly different coverage areas, and experiencing different radio condition.

The first aspect recognizes that it may be beneficial to map feedback corresponding to downlink carriers in a single band to the same HS-DPCCH. For example, if C(1) and C(3) are in one band, while C(2) and C(4) are in another band, the first aspect recognizes that it may be better to map the feedback for C(1) and C(3) to H(1) and the feedback for C(2) and C(4) to H(2).

According to the first aspect, mapping of carrier feedback to HS-DPCCHs first groups feedback corresponding to carriers in the same band. In some embodiments that grouping may be a pairing. Pairing may be particularly advantageous when utilizing a SF256 spreading code.

In one embodiment, N=6 and carriers C(1), C(2), C(3) and C(6) are activated and C(4) and C(5) are deactivated, where C(1) and C(3) are in the same band. In this embodiment, a grouping and feedback reporting system according to the first aspect may act to map C(1) and C(3) to H(1), C(2) to H(2) and C(6) to H(3). It will be appreciated that, according to the first aspect, the radio band within which a downlink carrier is being transmitted is determinative. Accordingly, C(4) would also be mapped to H(2) and C(5) to H(3) but since they are not activated, no feedback is transmitted.

In one embodiment, step (i) comprises the steps of receiving an indication of activated reception carriers and monitoring for a signal on at least one of those activated reception carriers.

In one embodiment, a mapping rule further takes into account the activated carriers. Thus feedback is first grouped or paired according to those downlink carriers being transmitted within the same radio band, and then grouped or paired according to which carriers are currently activated. In one embodiment, N=6 and carriers C(1), C(2), C(3) and C(6) are activated, where C(1) and C(3) are in the same band. This embodiment maps C(1) and C(3) to H(1), and C(2) and C(6) to H(2).

In one embodiment, step (iii) comprises grouping said feedback information for activated reception carriers being transmitted within the same radio band; and encoding said grouped feedback information for two or more activated reception carriers being transmitted within the same radio band.

It will be appreciated that a signal may not be received in respect of a reception carrier and that feedback information generated in respect of such a reception carrier may reflect that no signal has been received.

In one embodiment, step (ii) is carried out only for those reception carriers on which a signal is received.

In one embodiment, the first network node comprises user equipment and the second network node comprises a base station.

A second aspect provides a computer program product operable, when executed on a computer, to perform the method steps described in relation to the first aspect.

A third aspect provides a network node adapted to encode and transmit feedback information to a second network node in a multi-carrier wireless telecommunications network, the network node being operable to:
receive signals from the second network node on two or more reception carriers, each reception carrier being transmitted within an associated radio band, and
transmit data to the second network node on one or more transmission carriers, the network node comprising:
(i) monitoring logic operable to monitor for a signal on at least two of the reception carriers;
(ii) feedback information generation logic operable to generate feedback information for at least two of said reception carriers based upon received signals;
(iii) encoding logic operable to group said feedback information for reception carriers being transmitted within the same radio band; and encode the grouped feedback information for two or more reception carriers being transmitted within the same radio band; and
(iv) transmission logic operable to transmit the encoded feedback information to the second network node on one or more of the transmission carriers.

In one embodiment, the monitoring logic is operable to receive an indication of activated reception carriers and monitor for a signal on at least one of those activated reception carriers.

In one embodiment, the encoding logic is operable to group the feedback information for activated reception carriers having the same band; and encode the grouped feedback information for two or more activated reception carriers being transmitted within the same radio band.

In one embodiment, the feedback information generation logic is operable to generate feedback information for those reception carriers on which a signal was received.

In one embodiment, the network node comprises user equipment.

In one embodiment, the network node comprises a base station.

A further aspect provides a method for associating a plurality of feedback signaling instances to a plurality of feedback channels, wherein each feedback channel can be associated with at least two feedback signaling instances, wherein the feedback signaling instances associated with one feedback channel are first selected such that the feedback signaling instances correspond to radio signals received in the same band.

In one embodiment, the feedback signaling instances associated with one feedback channel are secondly selected according to the activation status of the corresponding radio signals.

A still further aspect provides a method of transmitting feedback information from a first network node to a second network node in a multi-carrier wireless telecommunications network, said first network node being operable to:
receive signals from said second network node on three or more reception carriers, each reception carrier being transmitted within an associated radio band, and
transmit data to said second network node on two or more transmission channels, said method comprising the steps of:
(i) monitoring for a signal on each of said reception carriers;
(ii) generating feedback information for each reception carrier based upon received signals;
(iii) grouping said feedback information for at least two reception carriers being transmitted within the same radio band; and
(iv) transmitting said grouped feedback information to said second network node on one transmission channel.

In one embodiment, the method further comprises the step of: transmitting feedback information for at least one reception carrier being transmitted within a different band on a different transmission channel.

In one embodiment, wherein step (i) further comprises the steps of receiving an indication of activated reception carriers and monitoring for a signal on each of those activated reception carriers.

In one embodiment, step (iii) comprises grouping the feedback information for activated reception carriers being transmitted within the same radio band.

In one embodiment, the further method further comprises the steps of:
after grouping said feedback information for any reception carriers being transmitted within the same radio band, grouping further feedback information for at least two reception carriers being transmitted within different bands; and
transmitting said grouped further feedback information to the second network node on one transmission channel.

In one embodiment, step (ii) is carried out only for those reception carriers on which a signal was received.

In one embodiment, the first network node comprises user equipment and the second network node comprises a base station.

A further aspect provides a network node operable to perform the method of the further aspects set out above.

A still further aspect provides a computer program product operable, when executed on a computer, to perform the method of the further aspects set out above.

Further particular and preferred aspects of the present invention are set out in the accompanying independent and dependent claims. Features of the dependent claims may be combined with features of the independent claims as appropriate and in combinations other than those explicitly set out in the claims.

BRIEF DESCRIPTION OF THE DRAWINGS

Embodiments of the present invention will now be described further, with reference to the drawings in which.

DESCRIPTION OF THE EMBODIMENTS

Figure 1:
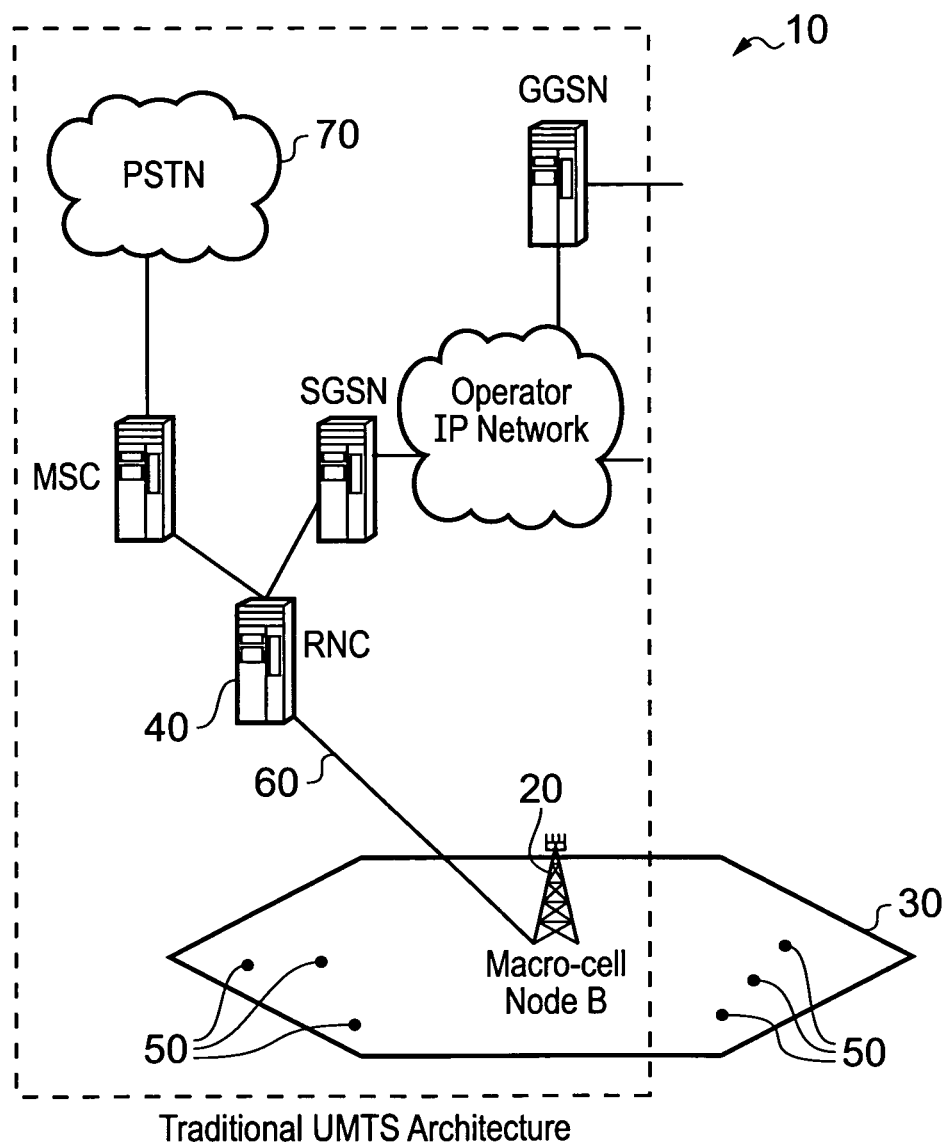
FIG. 1 illustrates the main components of a telecommunications network according to one embodiment.
Figure 2:
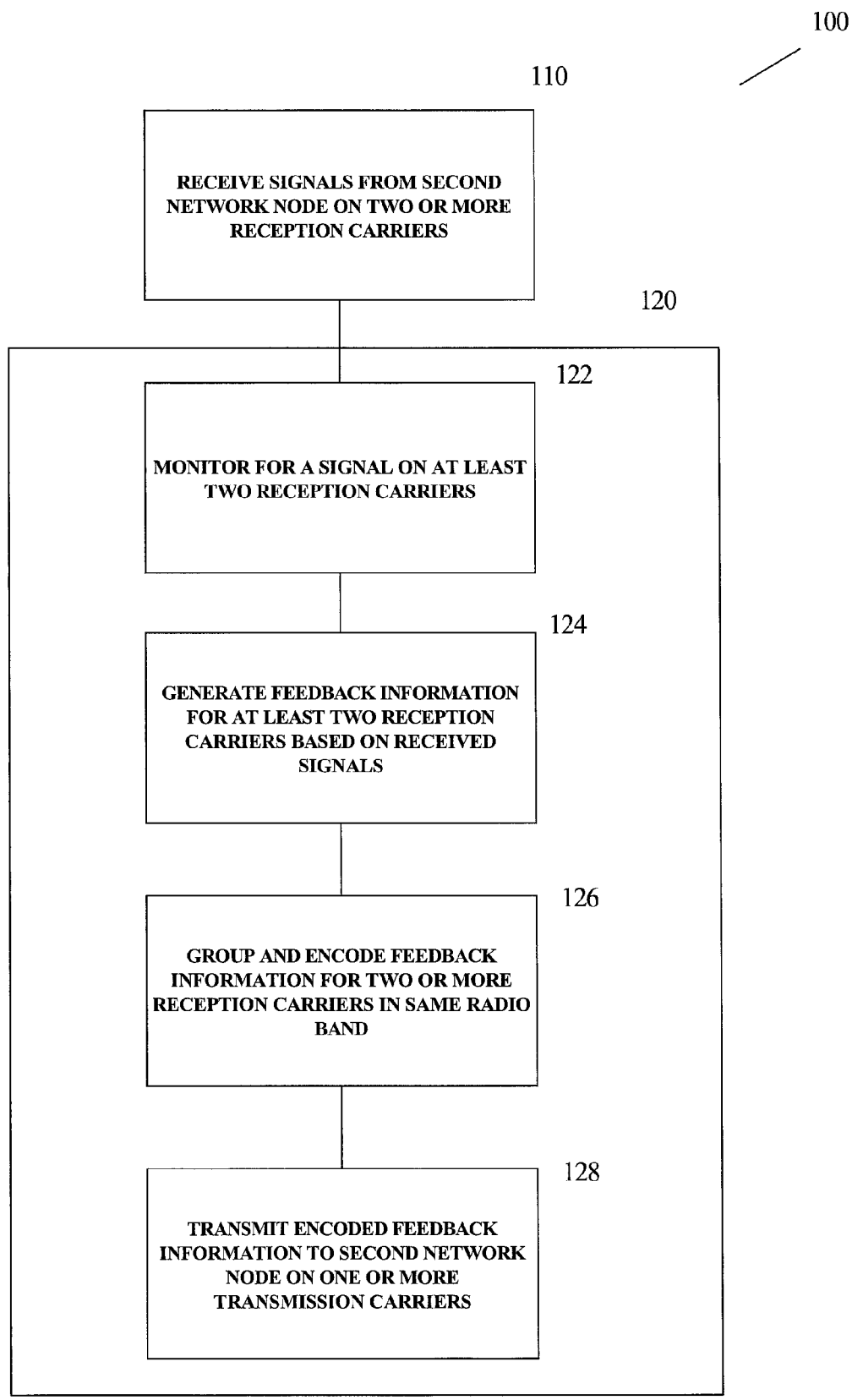
FIG. 2 illustrates a method 100 of operating a telecommunications system. In step 110, a first network node receives signals from a second network node on at least two network reception carriers, the carriers being transmitted within an associated radio band. The process of transmitting data from the first network node to the second network node 120 is also shown. In step 122, the first network node monitors at least two reception carriers for a signal. In step 124 the first network node generates feedback information for two or more reception carriers based on received signals. In step 126, the first network node groups feedback information for reception carriers being transmitted within the same radio band and encodes the grouped feedback information for at least two reception carriers being transmitted within the same radio band. In step 128, the first network node transmits the encoded feedback information to the second network node on one or more transmission carriers.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically a different antenna within a base station supports each associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The radio access network of the wireless communications system is managed by a radio network controller (RNC) 40. The radio network controller 40 controls operation of the wireless communications system by communicating with a plurality of base stations over a backhaul communications link 60. The network controller also communicates with user equipment 50 via each base station.

In HSDPA multi-carrier mode, each sector served by a base station can have several carrier frequencies or "carriers" associated therewith. A carrier or cell supported by a carrier covers the same geographical region as a sector. Each cell is served by a different carrier frequency. It will therefore be understood that in a single carrier system, a cell is equivalent to a sector since a sector has only one cell or carrier frequency. Nonetheless, in a multi-carrier network each sector may comprise several cells each cell being served simultaneously by a different carrier frequency.

A radio network controller 60 maintains a neighbour list which includes information about geographical relationships between sectors supported by base stations 20. In addition, the radio network controller 60 maintains location information which provides information on the location of user equipment 50 within the wireless communication system 10. The radio network controller is operable to route traffic via circuit switched and packet switched networks. Hence, a mobile switching centre is provided with which the radio network controller may communicate. The mobile switching centre can communicate with a circuit switched network such as a public switched telephone network (PSTN) 70. Similarly, a network controller can communicate with service general package radio service support nodes (SGSNs) and a gateway general packet support node (GGSN). The GGSN can communicate with a packet switched core such as for example, the Internet.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the radio network controller 40, allocates resources to user equipment in a manner that aims to optimise operation of the wireless telecommunications network 10.

A radio link is a connection between user equipment 50 and a cell of a base station. Dedicated radio links are formed when user equipment is in a "cell-DCH" state. When user equipment is not transmitting information such as text messages or voice information to a base station it is in a so-called "idle" state. When user equipment has information to transmit to a base station it chooses a connected state within which to operate. When in a "cell-DCH" state user equipment is able to use high speed uplink and/or downlink packet access radio resources to achieve a high uplink and/or downlink throughput.

In a multi-carrier system, each carrier will have independent downlink radio links from a base station to user equipment. Those downlink radio links are managed independently since each carrier will likely have different radio propagation paths to user equipment.

In a wireless telecommunications network operating with multiple downlink carriers, feedback is likely to be required for each downlink carrier provided. Such feedback may, for example, comprise: acknowledgement feedback for an implemented acknowledgement protocol, channel quality indicators (CQI), and pre-coding control indicators (PCI) used to indicate suitable transmission parameters for the data transmissions on each downlink carriers. It will be understood that such feedback can help to ensure that the network operates efficiently. For example, the feedback associated with utilizing a data transmission regime in which an acknowledgement protocol is operating enables transmission of redundant data packets, or transport blocks of data to be minimized. Feedback information in such a protocol (in the form of an ACK or NACK) can inform the network of whether a data packet is successfully received and, if an acknowledgement of successful receipt is fed back and received, there is no need to re-send that data packet. Protocols of the HARQ (Hybrid Automatic Repeat Request) types are examples of such an acknowledgement protocol.

In a system operating with only a single carrier, necessary feedback information relating to downlink carriers is signaled in an uplink carrier. The feedback information is signaled on a known format of an uplink signaling channel known as the High-Speed Dedicated Physical Control Channel (HS-DPCCH).

HS-DPCCH formats may use a spreading factor 256 channelization code. Such a format allows 10 bits per 0.666 ms timeslot. Those HS-DPCCH formats may allow an uplink carrier to carry feedback for up to 2 downlink carriers by multiplexing the relevant control information for the two carriers into the available bits of the SF256 code.

For HSDPA systems capable of operating in multi-carrier mode, more than two downlink carriers may be provided. It will be appreciated that in a multi-carrier network, the number of downlink carriers may not match the number of uplink carriers. Furthermore, the number of downlink carriers provided may not be exactly double the number of uplink carriers provided.

According to one embodiment, a feedback rule implementing use of a SF256 spreading code for a multi-carrier system may advantageously take into account that different downlink carriers may be experiencing different radio condition and that different downlink carriers may be activated and deactivated dynamically.

In a multi-carrier system there may be provided N downlink carriers. Those downlink carriers may be denoted by: C(1), C(2) ... C(n) ... to C(N). In such a system there may also be provided and a set of HS-DPCCHs. Those dedicated data channels may be provided on a single uplink carrier, or may be provided on one or more uplink carriers. Each available HS-DPCCH is denoted by: H(1), H(2) ... H(m) ... H(M) (where M may be equal to N/2 since each HS-DPCCH may carry feedback for 2 downlink carriers).

For systems where M is chosen to equal to N/2, one possibility regarding a mapping rule for implementing use of a SF256 spreading code is to map feedback for downlink carrier C(n) to HS-DPCCH H((n/2)) where (n/2) denotes rounding up to the nearest integer (the "ceiling" function).

However, that mapping rule may result in the use of more HS-DPCCH codes than are strictly necessary. For example: if N=4 and C(2) and C(3) are deactivated, then according to such a rule, two HS-DPCCHs will be required. A more efficient rule may take account of carrier activation. Use of more HS-DPCCHs than required has the disadvantage of increasing the cubic metric (CM) of the transmitted signal and therefore implementation costs. Such a rule also fails to take into account that the different carriers may be in different frequency bands with possibly different coverage areas, and experiencing different radio condition.

In one embodiment it is recognized that it may be beneficial to map feedback corresponding to downlink carriers in a single band to the same HS-DPCCH. For example, if C(1) and C(3) are in one band, while C(2) and C(4) are in another band, the first aspect recognizes that it may be better to map the feedback for C(1) and C(3) to H(1) and the feedback for C(2) and C(4) to H(2).

According to one embodiment, mapping of carrier feedback to HS-DPCCHs first groups feedback corresponding to carriers in the same band. In some embodiments that grouping may be a pairing. Pairing may be particularly advantageous when utilizing a SF256 spreading code.

In one embodiment, N=6 and carriers C(1), C(2), C(3) and C(6) are activated and C(4) and C(5) are deactivated, where C(1) and C(3) are in the same band. In this embodiment, a grouping and feedback reporting system according to the first aspect may act to map C(1) and C(3) to H(1), C(2) to H(2) and C(6) to H(3). It will be appreciated that, according to the first aspect, the radio band within which a downlink carrier is being transmitted is determinative. Accordingly, C(4) would also be mapped to H(2) and C(5) to H(3) but since they are not activated, no feedback is transmitted.

In one embodiment, a mapping rule further takes into account the activated carriers. Thus feedback is first grouped or paired according to those downlink carriers being transmitted within the same radio band, and then grouped or paired according to which carriers are currently activated. In one embodiment, N=6 and carriers C(1), C(2), C(3) and C(6) are activated, where C(1) and C(3) are in the same band. This embodiment maps C(1) and C(3) to H(1), and C(2) and C(6) to H(2).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labeled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of encoding and transmitting feedback information from a first network node to a second network node in a multi-carrier wireless telecommunications network, the first network node being configured to:
   receive signals from the second network node on two or more reception carriers, each reception carrier being transmitted within an associated radio band; and
   transmit data to the second network node on one or more transmission carriers, the transmission comprising:
      monitoring for a signal on at least two of the reception carriers,
         wherein the monitoring comprises receiving an indication of activated reception carriers and monitoring for a signal on at least one of those activated reception carriers;
      generating feedback information for at least two reception carriers based upon received signals,
         wherein the generating is carried out only for those reception carriers on which a signal was received;
      grouping the feedback information for reception carriers being transmitted within the same radio band and encoding the grouped feedback information for two or more reception carriers being transmitted within the same radio band, and
      transmitting the encoded feedback information to the second network node on one or more transmission carriers.

2. A method according to claim 1, wherein the grouping comprises grouping the feedback information for activated reception carriers being transmitted within the same radio band and encoding the grouped feedback information for two or more activated reception carriers being transmitted within the same radio band.

3. A method according to claim 1, wherein the first network node comprises user equipment and the second network node comprises a base station.

4. A method according to claim 1, wherein downlink reception carriers may be activated and deactivated dynamically and no feedback is transmitted for deactivated reception carriers.

5. A method of encoding and transmitting feedback information from a first network node to a second network node in a multi-carrier wireless telecommunications network, implemented by a programmable device comprising a non-transitory computer-readable storage medium in which a program is saved, the program comprising instructions which, when executed, prompt the first network node to:
   receive signals from the second network node on two or more reception carriers, each reception carrier being transmitted within an associated radio band; and
   transmit data to the second network node on one or more transmission carriers, the transmitting comprising:
      monitoring for a signal on at least two of the reception carriers, wherein the monitoring comprises receiving an indication of activated reception carriers and monitoring for a signal on at least one of those activated reception carriers;

generating feedback information for at least two reception carriers based upon received signals, wherein the generating is carried out only for those reception carriers on which a signal was received;

grouping the feedback information for reception carriers being transmitted within the same radio band and encoding the grouped feedback information for two or more reception carriers being transmitted within the same radio band; and transmitting the encoded feedback information to the second network node on one or more transmission carriers.

6. A method according to claim 5, wherein downlink reception carriers may be activated and deactivated dynamically and no feedback is transmitted for deactivated reception carriers.

7. A first network node configured to encode and transmit feedback information to a second network node in a multi-carrier wireless telecommunications network, the first network node being configured to:

receive signals from the second network node on two or more reception carriers, each reception carrier being transmitted within an associated radio band; and transmit data to the second network node on one or more transmission carriers, the first network node comprising:

monitoring logic configured to monitor for a signal on at least two of the reception carriers, wherein the monitoring logic is configured to receive an indication of activated reception carriers and monitor for a signal on at least one of those activated reception carriers;

feedback information generation logic configured to generate feedback information for at least two of the reception carriers based upon received signals;

wherein the feedback information generation logic is configured to generate feedback information only for those reception carriers on which a signal was received;

encoding logic configured to group the feedback information for reception carriers being transmitted within the same radio band and encode the grouped feedback information for two or more reception carriers being transmitted within the same radio band; and transmission logic configured to transmit the encoded feedback information to the second network node on one or more of the transmission carriers.

8. A first network node according to claim 7, wherein the encoding logic is configured to group the feedback information for activated reception carriers being transmitted within the same radio band and encode the grouped feedback information for two or more activated reception carriers being transmitted within the same radio band.

9. A first network node according to claim 7, wherein the first network node comprises user equipment.

10. A first network node according to claim 7, wherein the first network node comprises a base station.

11. A first network node according to claim 7, wherein downlink reception carriers may be activated and deactivated dynamically and no feedback is transmitted for deactivated reception carriers.

* * * * *